(12) United States Patent
Lee et al.

(10) Patent No.: US 9,846,941 B2
(45) Date of Patent: Dec. 19, 2017

(54) METHOD FOR SETTING EVENT RULES AND EVENT MONITORING APPARATUS USING SAME

(71) Applicant: SK TELECOM CO., LTD., Seoul (KR)

(72) Inventors: Hee-yul Lee, Daegu (KR); Gwang-gook Lee, Seongnam-si (KR); Ki-mun Kim, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 146 days.

(21) Appl. No.: 14/667,530

(22) Filed: Mar. 24, 2015

(65) Prior Publication Data

US 2015/0199810 A1    Jul. 16, 2015

Related U.S. Application Data

(63) Continuation of application No. PCT/KR2013/007612, filed on Aug. 26, 2013.

(30) Foreign Application Priority Data

Sep. 25, 2012  (KR) .................. 10-2012-0106799
Sep. 25, 2012  (KR) .................. 10-2012-0106801

(51) Int. Cl.
*G06T 7/00*    (2017.01)
*G06K 9/00*    (2006.01)
(Continued)

(52) U.S. Cl.
CPC .......... *G06T 7/004* (2013.01); *G06K 9/00771* (2013.01); *G06N 5/025* (2013.01);
(Continued)

(58) Field of Classification Search
CPC ... G06T 7/004; G06T 7/2033; G06K 9/00771; G06N 5/025
See application file for complete search history.

(56) References Cited

U.S. PATENT DOCUMENTS 8,525,876 B2 *  9/2013  Fan ................... G06K 9/00355
                                                         348/77
8,711,217 B2 *  4/2014  Venetianer .......... G06F 17/3079
                                                         348/143
(Continued)

FOREIGN PATENT DOCUMENTS

CN      1912950 A       2/2007
JP    2009225239 A     10/2009
(Continued)

OTHER PUBLICATIONS

International Search Report for PCT/KR2013/007612 dated Aug. 26, 2013, citing the above reference(s).
(Continued)

*Primary Examiner* — Kim Vu
*Assistant Examiner* — Molly Delaney
(74) *Attorney, Agent, or Firm* — Hauptman Ham, LLP

(57) ABSTRACT

An event monitoring apparatus comprises a setting command input unit, an event rule generator, an image receiver, an object-of-interest tracker, an event determiner, and an event detection information generator.

13 Claims, 9 Drawing Sheets

(51) Int. Cl.
*G06N 5/02* (2006.01)
*G06T 7/246* (2017.01)

(52) U.S. Cl.
CPC .... *G06T 7/246* (2017.01); *G06T 2207/20021* (2013.01); *G06T 2207/30196* (2013.01); *G06T 2207/30232* (2013.01); *G06T 2210/12* (2013.01); *G06T 2210/21* (2013.01)

(56) References Cited

U.S. PATENT DOCUMENTS

| | | | | |
|---|---|---|---|---|
| 9,213,900 B2* | 12/2015 | Bernal | ............... | G06K 9/00771 |
| 2004/0141635 A1* | 7/2004 | Liang | ................... | A61B 5/1113 |
| | | | | 382/110 |
| 2007/0127774 A1* | 6/2007 | Zhang | ............... | G06K 9/00771 |
| | | | | 382/103 |
| 2010/0260376 A1* | 10/2010 | Cobb | ................. | G06K 9/00771 |
| | | | | 382/103 |
| 2013/0182904 A1* | 7/2013 | Zhang | ..................... | H04N 7/18 |
| | | | | 382/103 |
| 2015/0199815 A1* | 7/2015 | Jo | ...................... | G06K 9/00771 |
| | | | | 382/103 |

FOREIGN PATENT DOCUMENTS

| | | |
|---|---|---|
| JP | 2012128877 A | 7/2012 |
| KR | 1020100050226 A | 5/2010 |
| KR | 1020120015998 A | 2/2012 |
| KR | 1020120025718 A | 3/2012 |

OTHER PUBLICATIONS

Chinese Office Action dated Jul. 6, 2016 corresponding to Chinese Application No. 201380049973.8 citing the above reference(s).

* cited by examiner

METHOD FOR SETTING EVENT RULES AND EVENT MONITORING APPARATUS USING SAME

CROSS-REFERENCE TO RELATED APPLICATION

The present application is a continuation of International Patent Application No. PCT/KR2013/007612, filed Aug. 26, 2013, which is based on and claims priority to Korean Patent Application No. 10-2012-0106799, filed on Sep. 25, 2012 and Korean Patent Application No. 10-2012-0106801, filed on Sep. 25, 2012. The disclosures of above-listed applications are hereby incorporated by reference in their entirely.

TECHNICAL FIELD

The present disclosure relates to a method for setting event rules and an event monitoring apparatus using the same.

BACKGROUND

The statements in this section merely provide background information related to the present disclosure and do not necessarily constitute prior art.

Where a boundary-of-interest is open with connected line segments, a known event monitoring apparatus generates an alarm when a one of the line segments on a monitor is crossed by a moving object. In case the boundary-of-interest is closed with connected line segments, so that it forms a region, the event monitoring apparatus generates an alarm in the event that a moving object enters or exits the region on the monitor.

Various methods have used information on all or a part of the boundary line segments (e.g., both end points of the line or points that consists line segments) and object information (e.g., position or trajectory) in order to detect such an event, or they have used positive or negative sign information of the object location for a boundary region so as to check whether the object is in or outside the region.

However, such event monitoring apparatus in some situation can neither detect various events, nor intuitively determine a sign and a distance of the object simultaneously, thereby causing a surveillance system to suffer from a loading delay.

SUMMARY

In some embodiments, an event monitoring apparatus comprises a setting command input unit, an event rule generator, an image receiver, an object-of-interest tracker, an event determiner, and an event detection information generator. The setting command input unit is configured to receive a setting command. The event rule generator is configured to set a boundary-of-interest based on the received setting command, set boundary reference values for determining a distance from the boundary-of-interest to object-of-interest and a sign value indicating whether the object-of-interest passes through the boundary-of-interest, and generate an event rule for detecting an event of the object-of-interest passing through the boundary-of-interest. The image receiver is configured to receive at least one frame of captured images from an image capturer. The object-of-interest tracker is configured to separate foreground pixels from pixels in the received frame by using background pixels designated by a predetermined criterion, and track the separated foreground pixels as the object-of-interest. The event determiner is configured to check a distance and a sign value of the object-of-interest based on the boundary reference values, and determine whether the event has occurred or not by comparing the distance and the sign value with predetermined thresholds according to the event rule. And the event detection information generator is configured to generate event detection information corresponding to the determined event, when the event determiner determines that the event has occurred.

In some embodiments, an event monitoring method performed by an event monitoring apparatus for setting event rules, the method comprising: setting a boundary-of-interest based on an inputted setting command; setting boundary reference values for determining a distance from the boundary-of-interest to an object-of-interest and a sign value indicating whether the object-of-interest passes through the boundary-of-interest; generating an event rule for detecting an event of an object-of-interest passing through the boundary-of-interest; receiving at least one frame of captured images from the image capturer; separating foreground pixels from pixels in the received frame by using background pixels designated by a predetermined criterion; tracking the object-of-interest in the foreground pixels; checking the distance and the sign value of the object-of-interest based on the boundary reference values; comparing the distance and the sign value of the object-of-interest with predetermined thresholds according to the event rule; and determining, when a distance value of the object-of-interest is greater than the predetermined threshold and the sign value of the object-of-interest is changed, that the event has occurred.

In some embodiments, an event monitoring apparatus comprises an image receiver, an input unit, a boundary-of-interest setter and an event rule generator. The image receiver is configured to receive images captured through a camera. The input unit is configured to receive a setting command input by a user operation. The boundary-of-interest setter is configured to set a boundary line in at least one frame of the images based on the setting command, and set added line regions in an area encompassing two or more points on a periphery of the frame and an end point on the boundary line. And the event rule generator configured to set boundary reference values including a distance and a sign value with respect to the boundary line as a reference, and generate an event rule for checking whether an object-of-interest in the frame crosses at least one of the boundary line and the added line regions.

In some embodiments, an event monitoring apparatus comprises an image receiver, an input unit, a boundary-of-interest setter and an event rule generator. The image receiver is configured to receive images captured through a camera. The input unit is configured to receive a setting command input by a user operation. The boundary-of-interest setter is configured to set a boundary region in at least one frame of the received images based on the setting command. And the event rule generator is configured to set boundary reference values including a distance and a sign value inside or outside the boundary region, and generate an event rule for checking whether an object-of-interest in the frame crosses the boundary region.

In some embodiments, an event monitoring method for setting event rules performed by an event monitoring apparatus for setting event rules, the method comprising: receiving images captured through a camera; setting a boundary line in at least one frame in the received images based on a setting command input by a user operation; setting added line regions in an area encompassing two or more points on a periphery of the frame and an end point on the boundary line; setting boundary reference values including a distance and a sign value with respect to the boundary line as a reference; and generating the event rule for checking whether an object-of-interest in the frame crosses at least one of the boundary line and the added line regions.

DETAILED DESCRIPTION

Figure 1:
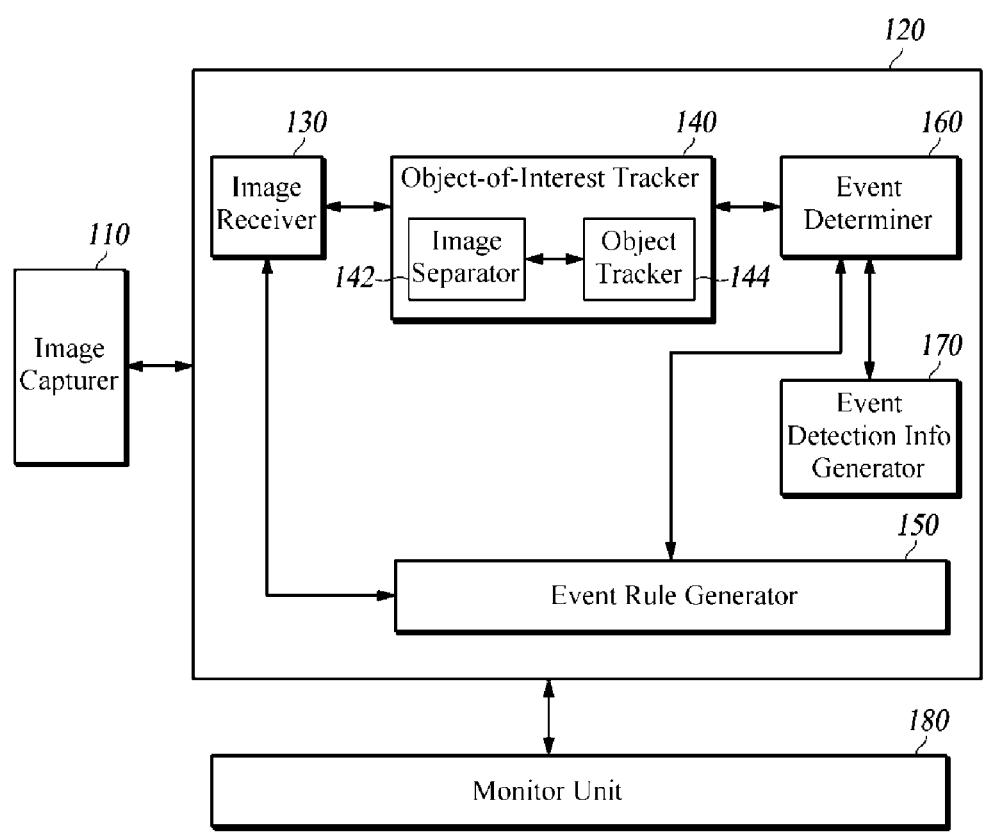
FIG. 1 is an exemplary schematic block diagram of an event monitoring system according to one or more embodiments.

The present disclosure in some embodiments seeks to provide an event rule setting method for generating an event rule for an event monitoring apparatus by generating sign map and distance map for a boundary-of-interest and checking a distance and sign value of an object-of-interest according to the generated event rule for monitoring such events as a trespass and breakaway, and an event monitoring apparatus using same.

Hereinafter, embodiments of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, various terms, such as first, second, A, B, (a), (b), etc., are used solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via one or more additional components.

FIG. 1 is an exemplary schematic block diagram of an event monitoring system according to one or more embodiments.

In some embodiments, the event monitoring system includes an image capturer 110, an event monitoring apparatus 120 and a monitor unit 180. Herein, the event monitoring apparatus 120 includes an image receiver 130, an object-of-interest tracker 140, an event rule generator 150, an event determiner 160, and an event detection information generator 170.

The image capturer 110 refers to a device capable of capturing images. In some embodiments, the image capturer 110 is implemented as a CCTV camera, a surveillance camera, and the like which are capable of capturing images to monitor such events as the movement of an object, trespass, breakaway, theft, and leaving an object unattended. The image capturer 110 transmits (e.g., via a direct cable connection and/or a wired or wireless network) captured images to the event monitoring apparatus 120 to monitor the event. Herein, in some embodiments, the captured images include a plurality of frames.

The event monitoring apparatus 120 extracts and tracts an object-of-interest from images captured by the image capturer 110, and monitors the occurrence of an event by using a pre-generated event rule. The components of the event monitoring apparatus 120 in some embodiments will be described in more detail below. In at least one embodiment, one or some or all components of the event monitoring apparatus 120 described herein is/are implemented by, and/or include(s), one or more processors and/or application-specific integrated circuits (ASICs) and/or non-transitory computer-readable medium (media). In one or more embodiments, the event monitoring apparatus 120 comprises input units, such as one or more buttons, a touch screen, a mic and so on, and/or output units, such as a display, an indicator and so on.

The image receiver 130 receives at least one frame of captured images from the image capturer 110 which is connected to the event monitoring apparatus 120. Herein, in some embodiments, the frame is a captured frame of the captured images, but is not limited thereto. The frame is selected from among a plurality of received frames.

The object-of-interest tracker 140 extracts and tracks a portion in motion from the images as an object-of-interest. The event determiner 160 determines whether or not the portion extracted and tracked as the object-of-interest by the object-of-interest tracker 140 is an object-of-interest corresponding to an event, based on an event rule.

The object-of-interest tracker 140 in some embodiments includes an image separator 142 and an object tracker 144.

The image separator 142 separates a captured image into foreground pixels and background pixels by using the Gaussian model for pixels. Herein, each of the pixels included in the captured image includes a predetermined number of Gaussian nodes. Each Gaussian node has a value such as a mean, a variance and a weighting factor.

The image separator 142 learns the Gaussian model for the pixels for a predetermined time as each node of the Gaussian model gets updates of its values such as a mean, a variance and a weighting factor and the node with the greatest weight factor is designated as a background node among the nodes of the Gaussian model. The image separator 142 extracts foreground pixels from the captured image based on the designated background node. In some embodiments, the image separator 142 updates values such as a mean, a variance and a weight of Gaussian nodes for the pixels of the captured image, and extracts pixels other than the pixels corresponding to the previously designated background node as foreground pixels. For example, captured video images have a person passing along, the pixels of the person non-corresponding to the background Gaussian node is extracted as foreground pixels to thereby separate the captured image into the foreground pixels for moving person.

The object tracker 144 tracks the object-of-interest by using the foreground image separated by the image separator 142. Herein, the foreground image is represented by 1 distinguishably from 0 representing the background image.

The object tracker 144 extracts identical objects from a plurality of frames by comparing moving objects corresponding to the foreground images from the frames with respect to at least one of color information, histogram, and shape of the objects and then tracks an extracted object-of-interest. When the moving objects are compared with each other with respect to the color information, information on the object histogram, shape and others are included for use.

The event rule generator 150 generates an event rule for the event determiner 160 to detect an event of the object-of-interest and transmits the generated event rule to the event determiner 160. Herein, the event rule as established by a manager's operation represents a criterion for recognizing the object-of-interest's motion of crossing a boundary-of-interest as an event.

The event rule generator 150 sets a boundary-of-interest for generating an event rule. Herein, the boundary-of-interest is adapted to detect an event, and it is set to be a boundary line or a boundary region. In the event rule generator 150, the setting of a boundary line as the boundary-of-interest means setting the boundary using a line segment or a curve. If a boundary region is set as the boundary-of-interest, this means setting the boundary using a closed curve formed by line segments or curves.

If boundary lines define the boundary-of-interest, the event rule generator 150 sets the boundary line in response to the manager's operation (e.g., a touch) of the interface (e.g., a touch screen as described herein) or input of coordinates, and forms an added line region with two line segments which connect an end point of the boundary line to each of two points on the periphery of the frame. Herein, in some embodiments, the added line regions exclude the central portion of the boundary line. Such added line region is generated when the boundary line does not meet the periphery of the frame, and is not generated when the boundary line bisects the frame. For example, when an angular boundary line is set, added line regions is set up based on the boundary line with each pair of line segments which connect the respective end points of the boundary line to each of two points on the periphery of the frame forming 120 degrees therebetween.

When a boundary region defines the boundary-of-interest, the event rule generator 150 sets the boundary region with a figure such as a rectangle, a triangle and a circle in response to the manager's operation (touch) of the interface or input of coordinates.

The event rule generator 150 sets boundary reference values including at least one of a distance and a sign value based on the set boundary-of-interest. The event rule generator 150 sets distances according to positions away from the boundary-of-interest. For example, with the boundary-of-interest set to 0, the event rule generator 150 sets distance increments by 1 for locations at a predetermined greater distance from the boundary-of-interest. In addition, the event rule generator 150 stores a plurality of distances set in this manner to generate a distance map. Further, the event rule generator 150 sets sign values based on the boundary-of-interest to check whether or not the object-of-interest has passed through or touch the boundary-of-interest. Herein, in some embodiments, the sign value is positive '+' or negative '−', but is not limited thereto. For example, in the monitoring operation of road traffic related events, and in particularly monitoring the events of vehicles crossing the boundary-of-interest from left to right, in some embodiments, the left side has '+' sign value and the right side has '−' sign value.

The event rule generator 150 generates an event rule based on the set boundary-of-interest and boundary reference values. Herein, the event rule is changeable through manager manipulations according to the characteristics of an event to be monitored. For example, when an event rule to set is for all events passing across the boundary-of-interest, an event rule setter 230 is provided to set up a rule for determining the occurrence of an event when the distance of the object-of-interest is greater than a predetermined threshold and the sign value changes from '+' to '−' or from '−' to '+'. Herein, the distance can be measured, for example, from the center or a point of the boundary or contour of the object-of-interest. When it is a point of the boundary or contour, the shortest distance can be selected. The event rule is also set to determine that no event occurred regardless of a change in the sign value if the distance of the object-of-interest is less than the predetermined threshold. Setting such event rule is to prevent an incorrect determination of events due to an object-of-interest being in the proximity of the boundary-of-interest within the predetermined distance and moving in and out of the boundary line or the boundary region. When boundary lines define the boundary-of-interest with an added line region formed, the event rule setter 230 sets the event rule to identify an event or nonevent from an object-of-interest with priority as it moves across the boundary-of-interest over the added line region.

The event determiner 160 receives an event rule from the event rule generator 150, and determines whether or not an object-of-interest generates an event, based on the received event rule. More specifically, the event determiner 160 determines whether there is the occurrence or nonoccurrence of the event of the object-of-interest crossing the boundary-of-interest by comparing the distance of the position of the object-of-interest with a predetermined threshold and checking if the sign value is changed, based on the event rule. Herein, the event is of an object-of-interest crossing a boundary line set as the boundary-of-interest, or it is of trespassing on or leaving a boundary region, if selected to be the boundary-of-interest.

When the distance of the object-of-interest is greater than a preset threshold, the event determiner 160 checks whether the sign value is changed, and determines a change occurred as an event. If the distance of the object-of-interest is less than the preset threshold, the event determiner 160 determines a nonevent, regardless of any changes in the sign value. Herein, the distance of the object-of-interest being less than the preset threshold, which means that the object-of-interest moves near the boundary-of-interest, is determined as representing the nonoccurrence of an event such as crossing, trespass, and breakaway.

In addition, the event determiner 160 determines the occurrence of an event only if the distance of the object-of-interest is greater than a preset threshold, the sign value is changed, and the object-of-interest crosses an added line region.

While the event determiner 160 is illustrated as determining the event occurrence only when the object-of-interest passes added line regions, embodiments of the present disclosure are not limited thereto. In some embodiments, the event rule is so preset as to negate an event when an object-of-interest crosses an added line region.

The event detection information generator 170 generates event detection information for the event determined by the event determiner 160 and transmits the event detection information to the monitor unit 180 to allow the manager to monitor the event.

The monitor unit 180 enables the manager to monitor event detection information detected by the event monitoring apparatus 120. The monitor unit 180 includes a display for the monitoring operation. In addition, the monitor unit 180 is implemented so as to perform short-range communication with the event monitoring apparatus 120 through, for example, Wireless LAN, Bluetooth, or ZigBee to receive detection information. While FIG. 1 illustrates the monitor unit 180 as being implemented separately from the event monitoring apparatus 120, embodiments of the present disclosure are not limited thereto. In some embodiments, the monitor unit 180 is incorporated, in whole or in part, into the event monitoring apparatus 120. For example, the display is incorporated into the event monitoring apparatus 120 in one or more embodiments.

The monitor unit 180 calculates statistical information of the event by using the detection information received from the event detection information generator 170. Herein, the statistical information refers to information calculated by checking the number of the events of the object-of-interest crossing, trespassing on, and escaping the boundary-of-interest. For example, the monitor unit 180 calculates statistical information of such events as the number of customers entering and exiting a store, the volume of traffic of vehicles passing through a road, and the number of people passing through a predetermined area. In at least one embodiment, the monitor unit 180 is implemented by, and/or includes, one or more processors and/or application-specific integrated circuits (ASICs) and/or non-transitory computer-readable medium (media).

Figure 2:
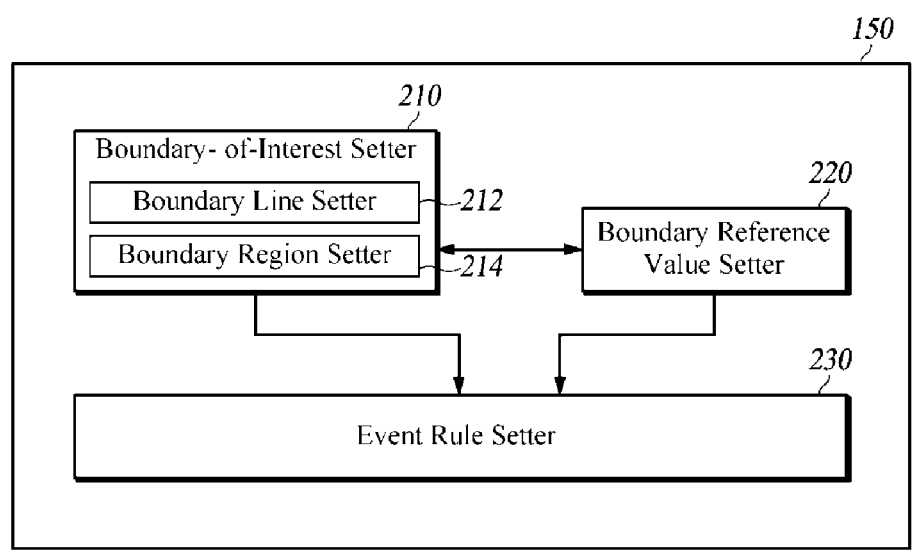
FIG. 2 is an exemplary schematic block diagram of an event rule generator included in an event monitoring system according to one or more embodiments.

FIG. 2 is an exemplary schematic block diagram of an event rule generator included in an event monitoring apparatus according to one or more embodiments.

The event rule generator 150 in some embodiments includes a boundary-of-interest setter 210, a boundary reference value setter 220 and the event rule setter 230.

The boundary-of-interest setter 210 in some embodiments sets a boundary-of-interest for detecting an event. Herein, the boundary-of-interest is a boundary generated through a manager's operation of the interface or input of coordinates. In some embodiments, the boundary-of-interest is a boundary line set by using a line segment and/or a curve, but is not limited thereto. The boundary-of-interest is a boundary region set by using a closed curve formed by line segments and/or curves. For example, when the event monitoring apparatus 120 monitors an event of customers entering a cosmetics shop at a department store, the boundary-of-interest setter 210 sets the entrance to the shop as the boundary-of-interest by using a line segment and counts a customer crossing the boundary-of-interest as an event to thereby monitor the event.

The boundary-of-interest setter 210 in some embodiments sets a boundary-of-interest according to a command input by the manager's operation for detecting events. Herein, the boundary-of-interest setter 210 includes a boundary line setter 212 and a boundary region setter 214.

The boundary line setter 212 sets a boundary line as the boundary-of-interest in the frame. Herein, the boundary line is generated through the manager's operation (touch) of the interface or input of coordinates. For example, when the event monitoring apparatus 120 monitors an event about customers entering a cosmetics shop at a department store, the boundary-of-interest setter 210 sets the entrance to the shop as the boundary-of-interest by using a line segment and counts a customer crossing the boundary-of-interest as an event to thereby monitor the event.

The boundary line setter 212 sets a boundary line by connecting at least two points by using a line segment and/or a curve, and forms an added line region with two line segments which connect an end point of the boundary line to each of two points on the periphery of the frame. Herein, the added line regions exclude the central portion of the boundary line. Such added line region is generated if the boundary line does not meet the periphery of the frame, and is not generated if the boundary line bisects the frame. Herein, the boundary line setter 212 may generate a line rule containing information such as lengths of extended lines, an angle therebetween, and the position of the periphery of the frame for generating added line regions.

If the boundary line is present in the frame without bisecting the frame, the frame is basically divided into two regions by the boundary line setter 212 using a single extension line from the boundary line, and an added line region is alternatively formed with two line segments which connect an end point of the boundary line to each of two points on the periphery of the frame based on a manager's command or a preset line rule. For example, when an angular boundary line is set, added line regions are set up based on the boundary line with each pair of line segments which connect the respective end points of the boundary line to each of two points on the periphery of the frame forming 120 degrees therebetween. The boundary line generated by the boundary line setter 212 may border an upper and a lower image section and a left and a right image section which are then assigned the sign value of '+' or '−' by the boundary reference value setter 220, while the added line regions generated by the boundary line setter 212 may not be assigned a sign value, and instead function as a guide line for determining whether an event has occurred based on whether an object-of-interest passes through added line regions.

The boundary region setter 214 sets a boundary region as the boundary-of-interest. Herein, the boundary region is generated through the manager's operation (touch) of the interface or input of coordinates. The boundary region setter 214 sets the boundary region by using a closed curve formed by line segments or curves. For example, the boundary region setter 214 may set a parking lot as the boundary region and use the same for detecting an event of a vehicle entering or leaving the boundary region.

The boundary reference value setter 220 sets boundary reference values including at least one of a distance and a sign value based on the boundary-of-interest.

The boundary reference value setter 220 sets distances based on the boundary-of-interest to monitor an event according to the distance of the object-of-interest. The boundary reference value setter 220 sets the distance of the boundary-of-interest to 0, and sets distance increments by a predetermined value for locations at a predetermined greater distance from the boundary-of-interest. Herein, the boundary reference value setter 220 may store a plurality of distances set in this manner to generate a distance map.

The boundary reference value setter 220 also sets sign values based on the boundary-of-interest to monitor an event according to the direction of movement of the object-of-interest. Herein, in some embodiments, the boundary reference value setter 220 stores the sign values set in this manner to generate a sign map. The sign value is '+' or '−', but is not limited thereto. When an object-of-interest crosses a boundary-of-interest, the boundary reference value setter 220 sets the sign value of the start point to '+' and the sign value of the arrival point to '−'. For example, when monitoring events of vehicles crossing the boundary-of-interest from left to right to determine the volume of traffic on the road, the sign value of the portion on the left side of the boundary-of-interest is set to '+', and the sign value of the portion on the right side is set to '−'. On the other hand, when monitoring an event of vehicles crossing the boundary-of-interest from right to left, the sign value of the portion on the right side of the boundary-of-interest is set to '+', and the sign value of the portion on the left side is set to '−'.

In some embodiments, when the added line regions are generated by the boundary-of-interest setter 210, the boundary reference value setter 220 sets distances based on the boundary-of-interest in the same manner, and set sign values of the regions except for the added line regions. For example, when a frame is set to have an upper region, a lower region and added boundary regions by using a boundary line, the boundary reference value setter 220 sets the sign value of the upper region to '+', and the sign value of the lower region to '−'. The added line regions are not assigned a sign value, but are used for the event rule setter 230 to check whether an object-of-interest crosses the added line regions.

The event rule setter 230 sets an event rule based on the boundary-of-interest generated by the boundary-of-interest setter 210 and the distances and sign values set by the boundary reference value setter 220. Herein, the event rule is changeable through manager manipulations according to the characteristics of an event to be monitored. For example, when the event rule to set is for all events passing across the boundary-of-interest, the event rule setter 230 is provided to set up a rule for determining the occurrence of an event if the distance of the object-of-interest is greater than a predetermined threshold, and the sign value changes from '+' to '−' or from '−' to '+'.

In some embodiments, when the event rule to set is for such events that pass across the boundary-of-interest in a predetermined direction, the event rule setter 230 sets the event rule for determining an event to be occurred, only if the distance of the object-of-interest is greater than a predetermined threshold and the sign value changes from '+' to '−'. In addition, the event rule set by the event rule setter 230 determines no event occurred regardless of any changes in the sign value, if the distance of the object-of-interest is less than the predetermined threshold. Setting such event rule is to prevent an incorrect determination of events due to an object-of-interest being in the proximity of the boundary-of-interest within the predetermined distance and moving in and out of the boundary line or the boundary region.

If boundary lines define the boundary-of-interest with an added line region formed, the event rule setter 230 sets the event rule to identify an event or nonevent from an object-of-interest with priority as it moves across the boundary-of-interest over the added line region.

Figure 3:
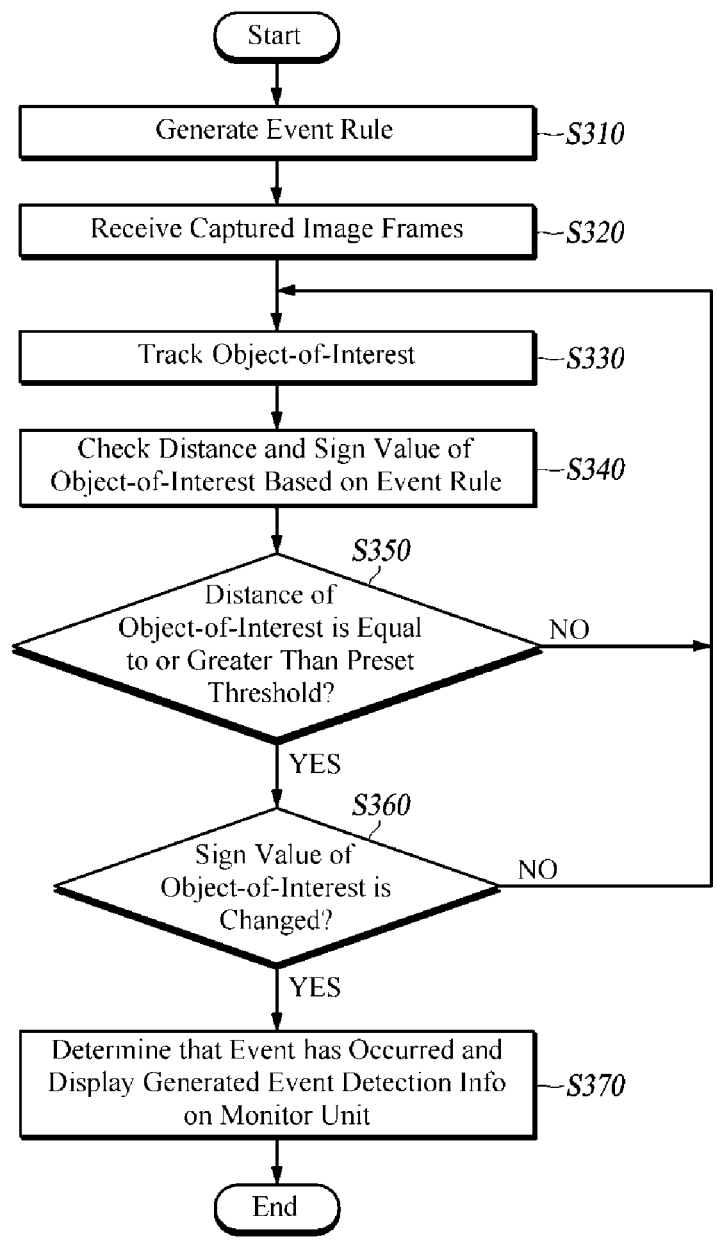
FIG. 3 is an exemplary flowchart of one method for setting event rules and monitoring events according to one or more embodiments.

FIG. 3 is an exemplary flowchart of one method for setting event rules and monitoring events according to at least one embodiment.

The event monitoring apparatus 120 generates an event rule for detecting an event (S310). Herein, the event rule, which is set through a manager's operation, refers to a criterion for recognizing the object-of-interest's motion of crossing a boundary-of-interest as an event. The event monitoring apparatus 120 sets the boundary-of-interest according to a boundary line or a boundary region for generating the event rule, and sets distance increments at predetermined greater distances from the boundary-of-interest. In addition, the event monitoring apparatus 120 sets sign values corresponding to '+' and '−' based on the boundary-of-interest. The event monitoring apparatus 120 generates the event rule once. The event rule is changed or a new event rule is generated if the boundary-of-interest is changed or the condition changes according to the characteristics of the boundary-of-interest to be monitored.

In some embodiments, the event monitoring apparatus 120 receives at least one frame of captured images from the image capturer 110 (S320). Herein, the frame is captured from recorded images, but is not limited thereto. The frame is selected from among a plurality of received frames.

The event monitoring apparatus 120 extracts and tracks a portion in motion from the images as an object-of-interest (S330). Herein, the event monitoring apparatus 120 designates background pixels of a captured image by using the Gaussian model for pixels, separates the other portion than the portion corresponding to the background pixels as foreground pixels, and tracks the object-of-interest by using the separated foreground pixels.

In Step S340, the event monitoring apparatus 120 checks the distance and the sign value of the object-of-interest based on the event rule generated in Step S310.

The event monitoring apparatus 120 determines whether or not the distance of the object-of-interest is greater than a threshold set by the event rule (S350). If it is determined in Step S350 that the distance of the object-of-interest is greater than the threshold set by the event rule, the event monitoring apparatus 120 determines whether or not the sign value of the object-of-interest is changed (S360). If the distance of the object-of-interest is less than threshold set by the event rule, indicating that the object-of-interest moves near the boundary-of-interest, the event monitoring apparatus 120 determines that the movement is not an event such as crossing, trespass, and escape.

If it is determined in Step S360 that the sign value of the object-of-interest is changed, the event monitoring apparatus 120 determines the occurrence of an event of crossing, trespassing on, and escaping the object-of-interest, and displays generated event detection information on a monitor unit (S370).

Although Steps S310 to S370 of FIG. 3 have been described as being sequentially performed, this is only an exemplary description of the technical concept of one or more embodiments. Those skilled in the art will appreciate that various modifications, additions and substitutions are possible, without departing from the characteristics of one or more embodiments of the disclosure. For example, the order of steps shown in FIG. 3 is changed, or one or more of Steps S310 to S370 is performed in parallel. Therefore, the present disclosure is not limited to the time-series order as shown in FIG. 3.

Figure 4:
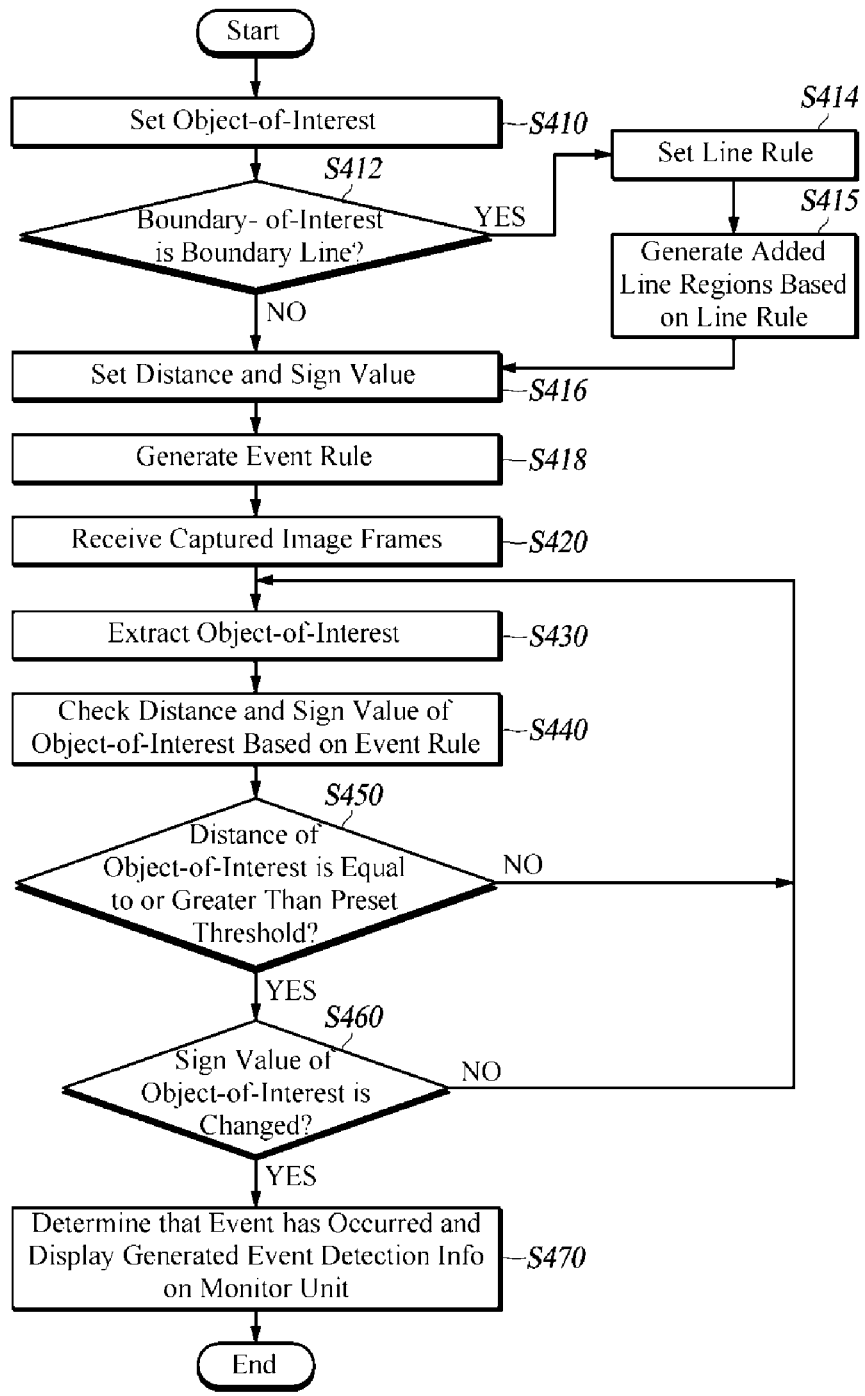
FIG. 4 is an exemplary flowchart of another method for setting event rules and monitoring events according to one or more embodiments.

FIG. 4 is an exemplary flowchart of another method for setting event rules and monitoring events according to at least one embodiment.

The event monitoring apparatus 120 sets a boundary-of-interest based on a command input through a user's operation (S410). Herein, the boundary-of-interest represents at least one of a boundary line from a boundary setting with a line segment and/or a curve and a boundary region set with a closed curve formed by line segments and/or curves.

The event monitoring apparatus 120 checks if the boundary-of-interest is a boundary line (S412). If it is determined in Step S412 that the boundary-of-interest is a boundary line, a line rule is set (S414), added line regions are generated based on the set line rule (S415), a distance and a sign value are set (S416). Herein, the added line region is formed with two line segments by connecting an end point of the boundary line to each of two points on the periphery of a frame. The line rule represents information such as lengths of extended lines, an angle therebetween, and the position of the periphery of the frame for generating added line regions. If it is determined in Step S412 that the boundary-of-interest is a boundary region, a distance and a sign value are set (S416).

The event monitoring apparatus 120 generates an event rule for detecting an event based on the boundary-of-interest, the distance and the sign value set in Steps S410 to S416 (S418). Herein, the event rule, which is set through a manager's operation, represents a criterion for recognizing the object-of-interest's action of crossing a boundary-of-interest as an event. The event monitoring apparatus 120 sets the boundary-of-interest according to a boundary line or a boundary region for generating the event rule, and sets distance increments for locations at a greater distance from the boundary-of-interest. In addition, the event monitoring apparatus 120 sets sign values corresponding to '+' and '−' based on the boundary-of-interest. The event monitoring apparatus 120 generates the event rule once. The event rule is changed or a new event rule is generated if the boundary-of-interest is changed or the condition changes according to the characteristics of the boundary-of-interest to be monitored.

The event monitoring apparatus 120 receives at least one frame of captured images from the image capturer 110 (S420). Herein, the frame is captured from recorded images, but is not limited thereto. The frame is selected from among a plurality of received frames.

The event monitoring apparatus 120 compares a previously stored background image with a frame and extracts a portion different between the stored background image and the frame as an object-of-interest (S430). Herein, the background image represents a background, not an object in motion.

The event monitoring apparatus 120 checks the distance and sign value of the object-of-interest based on the event rule generated in Step S418 (S440).

The event monitoring apparatus 120 determines whether or not the distance of the object-of-interest is greater than a threshold set by the event rule (S450). If it is determined in Step S450 that the distance of the object-of-interest is greater than the threshold set by the event rule, the event monitoring apparatus 120 determines whether or not the sign value of the object-of-interest is changed (S460). If the distance of the object-of-interest is less than the threshold set by the event rule, indicating that the object-of-interest moves near the boundary-of-interest, the event monitoring apparatus 120 determines nonoccurrence of an event such as crossing, trespass, and escape. In addition, the event determiner 160 may determine that the event has occurred only if the distance of the object-of-interest is greater than a preset threshold, the sign value is changed, and the object-of-interest crosses an added line region.

If it is determined in Step S460 that the sign value of the object-of-interest is changed, the event monitoring apparatus 120 determines the occurrence of an event of crossing, trespassing on, and escaping the object-of-interest, and displays generated event detection information on a monitor unit (S470).

Although Steps S410 to S470 of FIG. 4 have been described as being sequentially performed, this is only an exemplary description of the technical idea of at least one embodiment of the present disclosure. Those skilled in the art will appreciate that various modifications, additions and substitutions are possible, without departing from the characteristics of at least one embodiment of the disclosure. For example, the order of steps shown in FIG. 4 is changed, or one or more of Steps S410 to S470 is performed in parallel. Therefore, the present disclosure is not limited to the time-series order as shown in FIG. 4.

Figure 5:
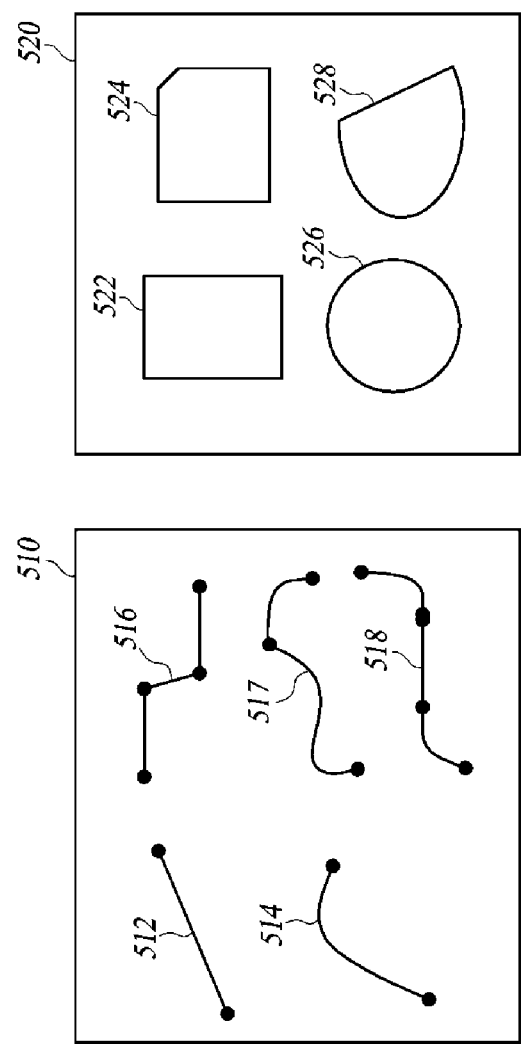
FIG. 5 is an exemplary diagram of a boundary-of-interest set up for generating event rules in an event monitoring apparatus according to one or more embodiments.

FIG. 5 is an exemplary diagram of a boundary-of-interest set up for generating event rules in an event monitoring apparatus according to at least one embodiment.

Depending on an input through the manager's manipulation with the event monitoring apparatus 120, the boundary-of-interest is set as line segments or curves such as a boundary line 510 or a closed curve such as a boundary region 520 surrounded by line segments or curves.

The boundary line 510 includes one or more of a straight line 512 connecting two points, a curve 514 connecting two points, straight lines connecting four points 516, a curve 517 connecting three points, and a curve 517 connecting four points. If the boundary line is a line segment that indicates the boundary for monitoring an event, it is implemented in any shapes of the line segment. Herein, the event monitoring apparatus 120 is used to monitor an event of the object-of-interest crossing the boundary line 510 in a predetermined direction.

The boundary region 520 includes one or more of a closed curve 522 having a rectangular shape and formed by lines, a closed curve 524 having a polygonal shape and formed by lines, a closed curve 526 having a circular shape and formed by a curve, and a closed curve 528 having a semi-circular shape and formed by a curve and a line. Herein, the event monitoring apparatus 120 is used to monitor an event of the object-of-interest such as crossing, trespassing on, and escaping the boundary region 520.

Figure 6:
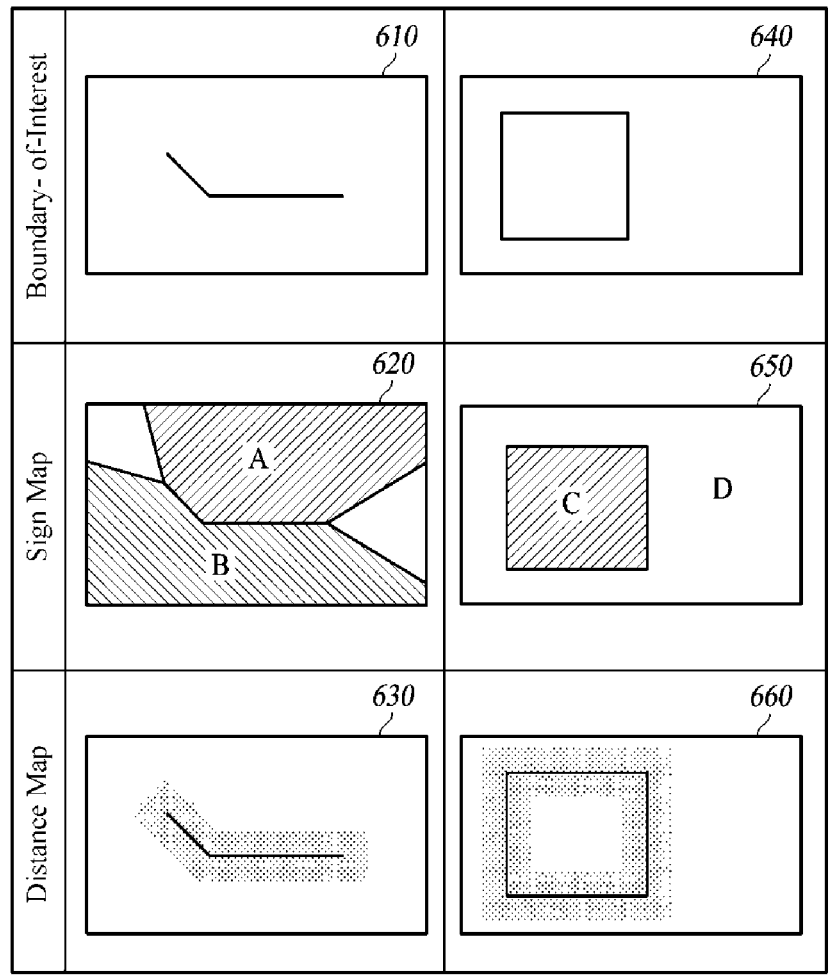
FIG. 6 is an exemplary diagram of maps generated by using the boundary-of-interest and a boundary reference value set up in the event monitoring apparatus according to one or more embodiments.

FIG. 6 is an exemplary diagram of maps generated by using the boundary-of-interest and boundary reference values set up in the event monitoring apparatus according to at least one embodiment.

The event monitoring apparatus 120 sets a boundary-of-interest for monitoring an event. For example, the event monitoring apparatus 120 sets an angular boundary line 610 by using two straight lines or sets a square boundary region 640 by using a closed curve formed by straight lines. Herein, the angular boundary line 610 is used for an event of an object-of-interest crossing the boundary-of-interest in one direction or two directions, and the square boundary region 640 is used for an event of the object-of-interest trespassing on or escaping the boundary region.

The event monitoring apparatus 120 sets sign values based on the boundary-of-interest which is set for monitoring the event, and stores the set sign values to generate a sign map. For example, an angular sign map 620 is generated by setting the sign value of region A to '+' and the sign value of region B to '−' based on the angular boundary line 610. With the angular sign map 620, the event monitoring apparatus 120 may monitor an event of an object-of-interest crossing the angular boundary line 610 from region A to region B. Meanwhile, a square sign map 650 is generated by setting the sign value of region C to '+' and the sign value of region D to '−' based on the square boundary region 640.

With the square sign map 650, the event monitoring apparatus 120 may monitor an event of an object-of-interest trespassing on or escaping the square boundary region 640 by moving from region C to region D.

The event monitoring apparatus 120 sets distances based on the boundary-of-interest to monitor the event, and stores the set distances to generate a distance map. The event monitoring apparatus 120 sets the distance to 0 at the boundary-of-interest, and sets distance increments by a predetermined value for locations at a predetermined greater distance from the boundary-of-interest. For example, an angular distance map 630 indicates distances by using contrast. A darker color indicates a distance closer to 0, while a brighter color indicates a distance set to a greater value. Herein, the event monitoring apparatus 120 sets a predetermined threshold, and determines whether or not the event has occurred if the distance of the position of the object-of-interest is greater than the predetermined threshold. If the distance of the position of the object-of-interest is less than the predetermined threshold, the event monitoring apparatus 120 recognizes that the event did not occur. A square distance map 660 indicates distances by using contrast. A position closer to the square boundary region 640 has a distance value closer to 0 and is indicated by a darker color. A position farther from the square boundary region 640 has a greater distance value and is indicated by a brighter color.

Figure 7:
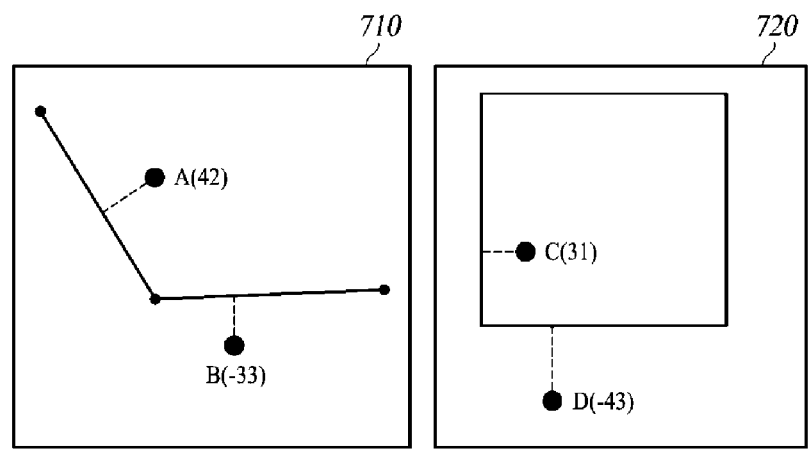
FIG. 7 is an exemplary diagram of an event detection according to an event rule generated based on a sign and a distance according to one or more embodiments.

FIG. 7 is an exemplary diagram of an event detection according to an event rule generated based on a sign and a distance according to at least one embodiment.

The following description will be directed to the operation of the event monitoring apparatus 120 in some embodiments for detecting an event 710 of an object-of-interest crossing a boundary line based on an event rule. When object-of-interest A moves to become object-of-interest B, the event monitoring apparatus 120 determines, based on a predetermined event rule, that the distance of object-of-interest A is 42 and the distance of object-of-interest B is 33, thereby determining that the distances are greater than a preset threshold, i.e., 30. In addition, since the sign value of object-of-interest A is '+', and the sign value of object-of-interest B is '−', the event monitoring apparatus 120 recognizes that the sign value of the object-of-interest is changed and the object-of-interest has crossed the boundary-of-interest, thereby determining the occurrence of a crossing event.

The following description will be directed to the operation of the event monitoring apparatus 120 in some embodiments for detecting an event 720 of an object-of-interest trespassing on a boundary region based on an event rule. When object-of-interest D moves to become object-of-interest C, the event monitoring apparatus 120 determines, based on a predetermined event rule, that the distance of object-of-interest D is 43 and that the distance of object-of-interest C is 31, thereby determining that the distances are greater than a preset threshold, i.e., 30. In addition, the event monitoring apparatus 120 determines the '−' sign value of object-of-interest D is changed to the '+' sign value of object-of-interest C, thereby recognizing that the object-of-interest has trespassed on the boundary region and determining the occurrence of a trespass event.

Figure 8:
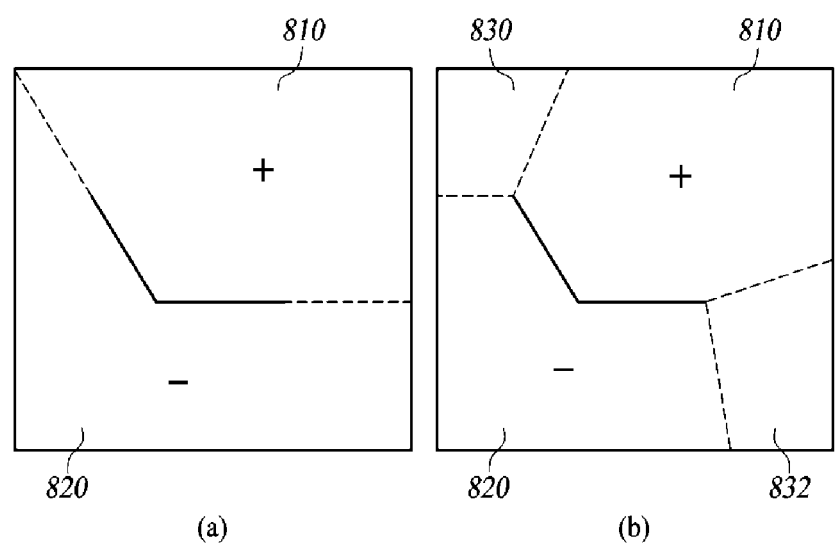
FIGS. 8(a) and 8(b) are exemplary diagrams of an operation of an event monitoring apparatus that sets up a boundary line and added line regions for generating a predetermined event rule according to one or more embodiments.

FIG. 8 is an exemplary diagram of an operation of an event monitoring apparatus that sets up a boundary line and added line regions for generating a predetermined event rule according to one or more embodiments.

FIG. 8(a) shows a frame when the event monitoring apparatus 120 generates an event rule, where a boundary line is set based on a command input through the manager's manipulation and the frame is divided into two regions by using respective lines extending from and in line with the boundary line. Referring to FIG. 8(a), the frame is divided into an upper region 810 and a lower region 820 based on the boundary line with the sign value of the upper region 810 set to '+' and the sign value of the lower region 820 set to '−'.

FIG. 8(b) shows a frame when the event monitoring apparatus 120 generates an event rule, where a boundary line is set based on a command input through the manager's manipulation, and a first added line region 830 and a second added line region 832 are set up with regions formed with two pairs of line segments by connecting both end points of the boundary line to their adjacent upper, lower and both lateral peripheries of the frame at predetermined angles. Referring to FIG. 8(b), the upper region 810 and the lower region 820 are divided by the boundary line. In addition, the sign value of the upper region 810 is set to '+', the sign value of the lower region 820 is set to '−', while the first added line region 830 and the second added line region 832 are not assigned sign values and whether or not an object-of-interest crossed the added line regions 830 and 832 becomes the criterion for determining the occurrence and nonoccurrence of an event. Herein, the first added line region 830 and the second added line region 832 is set symmetrically, but embodiments of the present disclosure are not limited thereto. The setting is changed according to a command input through the manager's manipulation.

Figure 9:
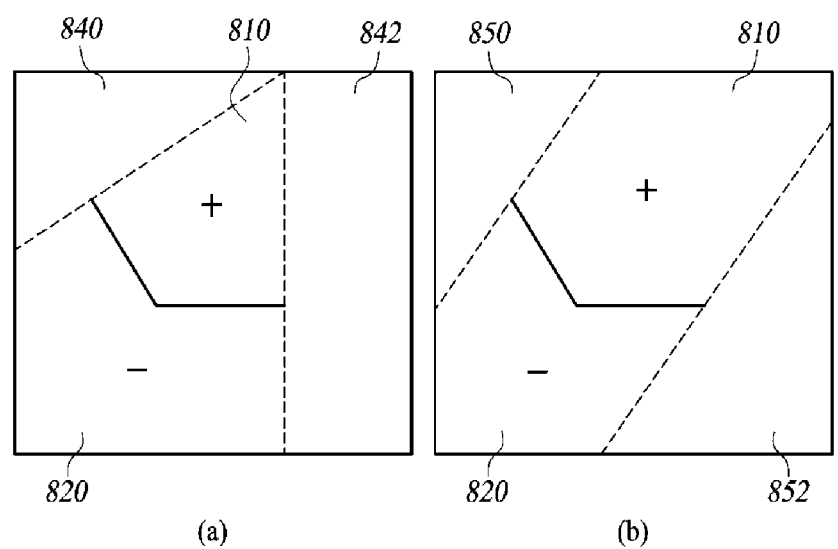
FIGS. 9(a) and 9(b) are exemplary diagrams of an operation of the event monitoring apparatus that sets up a boundary line and added line regions for generating a predetermined event rule according to one or more embodiments.

FIG. 9 is an exemplary diagram of an operation of the event monitoring apparatus that sets a boundary line and added line regions for generating a predetermined event rule according to at least one embodiment.

FIG. 9(a) shows a frame when the event monitoring apparatus 120 generates an event rule, where a boundary line is set based on a command input through the manager's manipulation, and a third added line region 840 and a fourth added line region 842 are set up with regions formed with two extension lines of the boundary line by connecting both end points of the boundary line at right angles to their adjacent upper, lower and lateral peripheries of the frame. Referring to FIG. 9(a), the upper region 810 and the lower region 820 are distinguished from each other by the boundary line. In addition, the sign value of the upper region 810 is set to '+', and the sign value of the lower region 820 is set to '−', while the third added line region 840 and the fourth added line region 842 are set as a criterion for determining the occurrence and nonoccurrence of an event of the object-of-interest crossing the added line regions 840 and 842, rather than being assigned a sign value.

FIG. 9(b) shows a frame in which the event monitoring apparatus 120 sets a boundary line based on a command input through the manager's operation, and sets, as a fifth added line region 850 and a sixth added line region 852, regions generated between extended lines forming 180 degrees therebetween by connecting both end points of the boundary line to the upper end, lower end, and lateral ends of the periphery of the frame which are adjacent to the boundary line in generating an event rule. Referring to FIG. 9(b), the upper region 810 and the lower region 820 are distinguished from each other by the boundary line. In addition, the sign value of the upper region 810 is set to '+', and the sign value of the lower region 820 is set to '−', while the fifth added line region 850 and the sixth added line region 852 are set as a criterion for determining the occurrence and nonoccurrence of an event of the object-of-interest crossing the added line regions 850 and 852, rather than being assigned a sign value.

As described above, the present disclosure is highly useful for application in the fields of event surveillance. Since various event rules can be set based on only a distance and a sign value, intuitive event rules can be easily derived. Further, since the occurrence of an event is determined based on the event rules, system load for determining the occurrence of the event is minimized. According to the present disclosure as described above, an event rule is generated by setting a boundary-of-interest and boundary reference values, and a distance and a sign value of an object-of-interest is checked according to the generated event rule for monitoring such events as a trespass and breakaway. Thereby, various event rules can be set based simply on the distance and the sign value, and accordingly intuitive event rules can be easily derived. Further, as the event rules form the basis of determining whether or not an event has occurred, the system load for determining the event can be minimized. Moreover, as events are detected based on event rules, the number of events according to an event rule is checked to yield statistics.

Although exemplary embodiments of the present disclosure have been described for illustrative purposes, those skilled in the art will appreciate that various modifications, additions and substitutions are possible, without departing from the characteristics of the disclosure. That is, it is understood that the present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. An event monitoring apparatus, comprising:
    an event rule generator, implemented by one or more processors, configured to
        set a boundary-of-interest based on a setting command input by a user operation through a setting command input unit,
        set boundary reference values for determining a distance from the boundary-of-interest to object-of-interest and a sign value indicating whether the object-of-interest passes through the boundary-of-interest and
        generate an event rule for detecting an event of the object-of-interest passing through the boundary-of-interest;
    an image receiver, implemented by one or more processors, configured to receive at least one frame of captured images from an image capturer;
    an object-of-interest tracker, implemented by one or more processors, configured to separate foreground pixels from pixels in the received frame by using background pixels designated by a predetermined criterion, and track the separated foreground pixels as the object-of-interest;
    an event determiner, implemented by one or more processors, configured to check a distance and a sign value of the object-of-interest based on the boundary reference values, and determine whether the event has occurred or not by comparing the distance and the sign value with predetermined thresholds according to the event rule; and
    an event detection information generator, implemented by one or more processors, configured to generate event detection information corresponding to the determined event, when the event determiner determines that the event has occurred.

2. The event monitoring apparatus of claim 1,
    wherein the object-of-interest tracker is configured to separate the foreground pixels from the received frame by using the background pixels designated by a Gaussian model, and
    wherein the foreground pixels are generated by using at least one of a mean, a variance and a weight of the pixels in the received frame.

3. The event monitoring apparatus of claim 2, wherein the object-of-interest tracker is configured to
    extract the object-of-interest by comparing at least one of color information, histogram and object shape of an object in motion between foreground images from a plurality of frames received from the image capturer, and
    tracks the extracted object-of-interest.

4. The event monitoring apparatus of claim 1, wherein, when the distance of the object-of-interest is greater than the predetermined threshold and the sign value of the object-of-interest is changed, the event determiner in configured to determine that the event has occurred.

5. The event monitoring apparatus of claim 1, wherein the event rule generator comprises:
    a boundary-of-interest setter configured to set the boundary-of-interest by using a line segment or a curve;
    a boundary reference value setter configured to
        set a predetermined distance value according to a distance from boundary-of-interest and a predetermined sign value with respect to the boundary-of-interest, and
        generate the boundary reference values based on the predetermined distance value and the predetermined sign value; and
    an event rule setter configured to set the event rule for detecting an event by using the boundary-of-interest and the boundary reference values, the event rule being set to determine the object-of-interest passing through the boundary-of-interest in a predetermined direction with respect to the boundary-of-interest as the event.

6. The event monitoring apparatus of claim 5, wherein the boundary-of-interest setter is configured to set the boundary-of-interest by using at least one of a boundary line and a boundary region, the boundary line and the boundary region being set by (i) a touch of an interface for the frame or (ii) a coordinate value.

7. The event monitoring apparatus of claim 5, wherein the boundary reference value setter is configured to
    increase the predetermined distance value every time the distance with respect to the boundary-of-interest increases by a predetermined distance, and
    set the predetermined sign value based on the boundary-of-interest.

8. The event monitoring apparatus of claim 7, wherein the boundary reference value setter is configured to generate a distance-sign map for storing the distance and sign of the boundary-of-interest by using a plurality of the predetermined distance values and a plurality of the predetermined sign values.

9. The event monitoring apparatus of claim 1, wherein the event detection information generator is configured to transmit the event detection information to a monitor unit, the monitor unit being configured to compute statistical information about the event by using the event detection information.

10. An event monitoring method performed by an event monitoring apparatus for setting event rules, the event monitoring apparatus including one or more processors to execute the method comprising:
   setting a boundary-of-interest based on an inputted setting command;
   setting boundary reference values for determining a distance from the boundary-of-interest to an object-of-interest and a sign value indicating whether the object-of-interest passes through the boundary-of-interest;
   generating an event rule for detecting an event of an object-of-interest passing through the boundary-of-interest;
   receiving at least one frame of captured images from an image capturer;
   separating foreground pixels from pixels in the received frame by using background pixels designated by a predetermined criterion;
   tracking the object-of-interest in the foreground pixels;
   checking the distance and the sign value of the object-of-interest based on the boundary reference values;
   comparing the distance and the sign value of the object-of-interest with predetermined thresholds according to the event rule; and
   determining, when a distance value of the object-of-interest is greater than the predetermined threshold and the sign value of the object-of-interest is changed, that the event has occurred.

11. The method of claim 10,
   wherein the boundary reference values comprises a predetermined distance value and a predetermined sign value,
   wherein the predetermined distance value increases every time a distance from the boundary-of-interest increases by a predetermined distance, and
   wherein the predetermined sign value is set to at least one of a positive sign and a negative sign with respect to the boundary-of-interest.

12. An event monitoring apparatus, comprising:
   an image receiver, implemented by one or more processors, configured to receive at least one frame of captured images from an image capturer;
   a setting command input unit, implemented by one or more processors, configured to receive a setting command input by a user operation;
   a boundary-of-interest setter, implemented by one or more processors, configured to set a boundary region in at least one frame of the received images based on the setting command; and
   an event rule generator, implemented by one or more processors, configured to
      set boundary reference values including a distance and a sign value inside or outside the boundary region, and
      generate an event rule for checking whether an object-of-interest in the frame crosses the boundary region.

13. The event monitoring apparatus of claim 12, wherein the boundary-of-interest setter is configured to set the boundary region inside a closed curve including at least one line segment or at least one curve.

* * * * *